United States Patent
Wakabayashi

(10) Patent No.: US 9,762,045 B2
(45) Date of Patent: Sep. 12, 2017

(54) HEAT-SHRINKABLE SLITTED TUBE

(71) Applicant: SUMITOMO WIRING SYSTEMS, LTD., Mie (JP)

(72) Inventor: Masataka Wakabayashi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 15/029,381

(22) PCT Filed: Oct. 3, 2014

(86) PCT No.: PCT/JP2014/076492
§ 371 (c)(1),
(2) Date: Apr. 14, 2016

(87) PCT Pub. No.: WO2015/060096
PCT Pub. Date: Apr. 30, 2015

(65) Prior Publication Data
US 2016/0268794 A1    Sep. 15, 2016

(30) Foreign Application Priority Data

Oct. 24, 2013   (JP) .................................. 2013-221105

(51) Int. Cl.
*F16L 55/00* (2006.01)
*H02G 15/18* (2006.01)
(Continued)

(52) U.S. Cl.
CPC ......... *H02G 15/1813* (2013.01); *H01R 4/183* (2013.01); *H01R 4/72* (2013.01);
(Continued)

(58) Field of Classification Search
USPC .......................... 138/104, 110, 128, 169, 170
See application file for complete search history.

(56) References Cited

U.S. PATENT DOCUMENTS 3,770,556 A * 11/1973 Evans .................... B29C 61/10
138/155
4,200,676 A * 4/1980 Caponigro ............ B29C 61/003
156/157
(Continued)

FOREIGN PATENT DOCUMENTS

JP    36733/1982    2/1982
JP    60-116430     6/1985
(Continued)

OTHER PUBLICATIONS

Search Report issued by PCT/JP2014/076492 patent office in PCT/JP2014/076492 Patent Application No. , dated Dec. 9, 2014.

*Primary Examiner* — James Hook
(74) *Attorney, Agent, or Firm* — Greenblum & Bernstein, P.L.C.

(57)    ABSTRACT

A heat-shrinkable slitted tube includes a tube main body capable of bending into a tube shape and which shrinks due to application of heat; and a heat-resistant tape which, in a closed state where the tube main body is deformed so as to close a slit extending in a length direction, fastens together areas proximate to two end portions of the tube main body so as to maintain the closed state. In the heat-shrinkable slitted tube, in a case where, by affixing the heat-resistant tape to the tube main body such that one of the end portions is positioned at a short-direction center portion of an indicator of the heat-resistant tape, the other end portion is brought together with the end portion to achieve the closed state, the heat-resistant tape is affixed so as to intervene between the areas proximate to the two end portions.

8 Claims, 12 Drawing Sheets

(51) Int. Cl.
*H02G 3/04* (2006.01)
*H01R 4/72* (2006.01)
*H02G 1/14* (2006.01)
*H01R 4/18* (2006.01)

(52) U.S. Cl.
CPC ............... *H02G 1/14* (2013.01); *H02G 3/04* (2013.01); *H01R 4/185* (2013.01)

(56) References Cited

U.S. PATENT DOCUMENTS

| | | | | |
|---|---|---|---|---|
| 4,275,768 A | * | 6/1981 | Riggs | F16L 11/124 138/104 |
| 4,586,610 A | * | 5/1986 | Gandolfo | G09F 3/0295 206/345 |
| 5,390,964 A | * | 2/1995 | Gray, Jr. | B29C 61/0608 138/104 |
| 5,520,218 A | * | 5/1996 | Hlavinka | B29C 65/743 138/104 |
| 5,733,614 A | | 3/1998 | Stieb | |
| 6,015,600 A | * | 1/2000 | Greuel, Jr. | B29C 61/0608 174/74 A |
| 6,337,115 B1 | * | 1/2002 | McMahon | B29C 61/0608 138/110 |
| 6,410,848 B1 | | 6/2002 | Shrader et al. | |
| 2007/0245585 A1 | * | 10/2007 | Richardson | B65H 55/00 33/756 |
| 2013/0186671 A1 | * | 7/2013 | Theis | H01B 7/368 174/112 |
| 2014/0083547 A1 | * | 3/2014 | Hwang | F16L 11/124 138/104 |

FOREIGN PATENT DOCUMENTS

| | | |
|---|---|---|
| JP | 7-248094 | 9/1995 |
| JP | 2001-028821 | 1/2001 |

\* cited by examiner

HEAT-SHRINKABLE SLITTED TUBE

FIELD OF THE INVENTION

The present invention relates to a heat-shrinkable slitted tube.

BACKGROUND OF THE INVENTION

A shrinkable tube covering an object by shrinking due to an application of heat and reducing in diameter (a so-called heat-shrinkable tube) enables a reliable sheathing performance to be obtained with a simple procedure, and therefore is widely used for a variety of applications such as bundling electric wires or the like; protecting electric wire terminals or electric wire connections; and insulation.

For example, in a case where a wire harness is to be assembled by bundling a group of wires using a shrinkable tube, a worker inserts a group of wires to be bundled into an interior of the shrinkable tube, then applies heat to the shrinkable tube. This causes the shrinkable tube to contract and reduce in diameter, adhering to an outer circumference of the group of wires and tightening around them. Thus a wire harness can be obtained in which a group of wires is tightly bundled.

Although a conventional shrinkable tube has excellent sheathing performance, due to the tubular shape of the tube, the conventional shrinkable tube can only be used with head-insertion. For example, in a case where a group of wires is to be bundled by the shrinkable tube, a connection terminal connected to a tip of each wire must be temporarily removed in order to pass the group of wires through the interior of the shrinkable tube, and once the group of wires has been passed through the interior of the shrinkable tube, the connection terminals must be reattached to each wire. The necessity of such tasks involves an extremely large amount of time and effort.

Given this, a configuration is known for such a shrinkable tube in which, by including a slit running the entire length direction of the shrinkable tube, an object to be covered can be accommodated within the shrinkable tube through the slit portion (see, for example, Patent Literature 1).

SUMMARY OF THE INVENTION

Problems to Be Solved by the Invention

In this example of a shrinkable tube, such as that noted above, in a case where each end portion of the shrinkable tube, between which the slit portion intervenes, abut during shrinking, there is a possibility of failure in wrapping around the group of wires. Therefore, an overlap margin must be provided such that areas proximate to each end portion may overlap, leaving an issue in which the size of the shrinkable tube cannot be sufficiently reduced. Furthermore, because a shrinkable tube of this kind is deformable, there is difficulty in bringing the two end portions together prior to shrinking.

In view of the circumstances above, the present invention provides a heat-shrinkable slitted tube in which two end portions can be readily brought together and shrunk, and which is capable of reducing costs by reducing the size of the heat-shrinkable slitted tube.

Means for Solving the Problems

A heat-shrinkable slitted tube according to the present invention includes a tube main body capable of bending into a tube shape encircling a wire or wire bundle, the tube main body including a slit extending in a length direction and shrinking due to application of heat; and a member fastening the tube in a closed state. In a closed state where the tube main body is deformed so as to close the slit, the member fastening the tube in the closed state fastens together areas proximate to two end portions of the tube main body so as to maintain the closed state. The member fastening the tube in the closed state includes, at a short-direction center portion of the member, an indicator in the shape of a straight line extending in a length direction.

With this configuration, the heat-shrinkable slitted tube according to the present invention maintains the closed state prior to shrinking using the member fastening the tube in the closed state, and even when the closed state is achieved by bringing together the two end portions of the tube main body at the time of shrinking, shrinking is performed while the closed state is maintained by the member fastening the tube in the closed state, enabling shrinking to be performed without wrapping failure. Therefore, in the heat-shrinkable slitted tube, there is no need to provide the tube main body with overlap margins, and the tube main body can be reduced in size, and costs can be reduced.

In addition, in the heat-shrinkable slitted tube according to the present invention, in a case where the two end portions of the tube main body are brought together to achieve the closed state in which the slit is closed prior to shrinking, by using a position of the indicator as a reference to bring the two end portions together, the member fastening the tube in the closed state can be reliably provided to the areas proximate to the two end portions and the closed state can be maintained. Therefore, the closed state can be readily achieved and the heat-shrinkable slitted tube can be attached to the wire or wire bundle.

In addition, in the heat-shrinkable slitted tube according to the present invention, the member fastening the tube in the closed state may be configured by a heat-resistant tape affixed so as to intervene between the areas proximate to the two end portions of the tube main body.

With this configuration, because the heat-shrinkable slitted tube according to the present invention maintains the closed state with the heat-resistant tape, the heat-resistant tape (member fastening the tube in the closed state) is not altered by heating during shrinking and the closed state can be reliably maintained. In addition, by affixing the heat-resistant tape, the closed state can be readily maintained even prior to shrinking, and therefore work efficiency can be improved.

Also, in the heat-shrinkable slitted tube according to the present invention, the indicator may be configured with a color differing according to a classification of the wire or wire bundle which the tube main body encircles.

With this configuration, the heat-shrinkable slitted tube according to the present invention enables identification of the classification of the wire or wire bundle to which the heat-shrinkable slitted tube is attached, using the color of the indicator.

Furthermore, in the heat-shrinkable slitted tube according to the present invention, the member fastening the tube in the closed state may be configured by a first surface on which the indicator is formed and a second surface on which is formed an adhesive layer to be affixed to the tube main body. The member fastening the tube in the closed state may also include a projection extending in a length direction at a position on the second surface located opposite the indicator.

With this configuration, the heat-shrinkable slitted tube according to the present invention can achieve the closed state by bringing the two end portions of the tube main body into contact with the projection prior to shrinking. Therefore, the closed state can be readily achieved and the heat-shrinkable slitted tube can be attached to the wire or wire bundle.

In addition, in the heat-shrinkable slitted tube according to the present invention, the member fastening the tube in the closed state may be configured such that the slit is visible through the indicator.

With this configuration, the heat-shrinkable slitted tube according to the present invention enables viewing a status of the two end portions of the tube main body through the indicator prior to shrinking. Therefore, the two end portions can be readily brought together to achieve the closed state and the heat-shrinkable slitted tube can be attached to the wire or wire bundle.

Effect of the Invention

According to the present invention, a heat-shrinkable slitted tube can be provided in which two end portions can be readily brought together and shrunk, and which is capable of reducing costs by reducing the size of the heat-shrinkable slitted tube.

MODE FOR CARRYING OUT THE INVENTION

Hereafter, an embodiment of the present invention is described with reference to the drawings.

Figure 1:
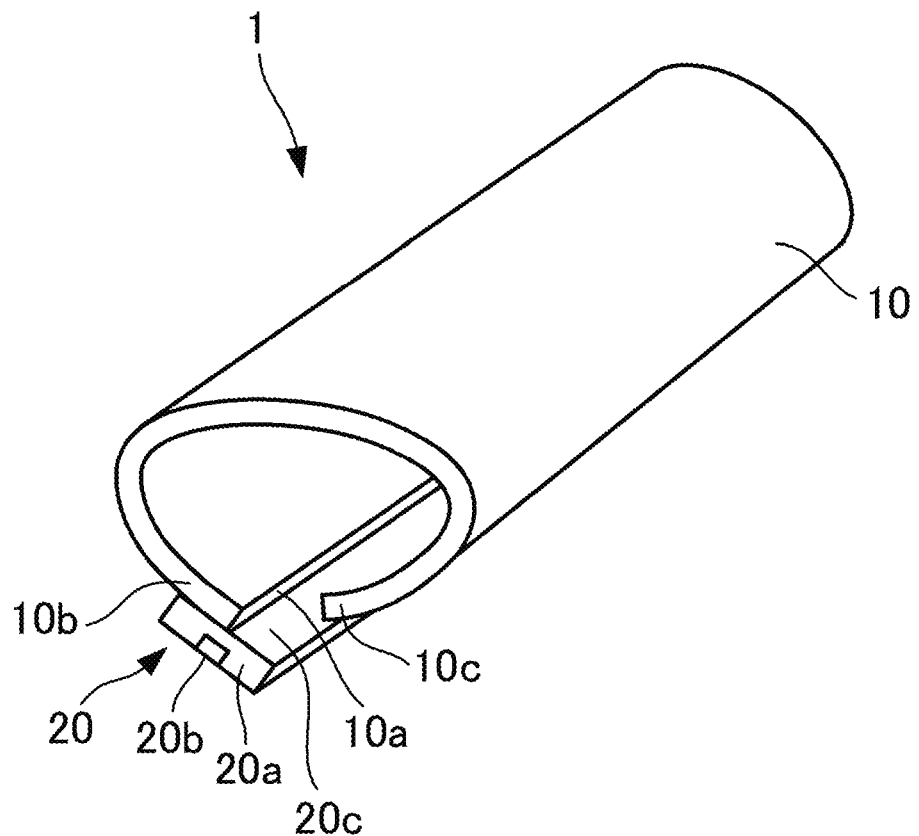
FIG. 1 is a schematic perspective view illustrating a heat-shrinkable slitted tube according to an embodiment of the present invention.
Figure 2:
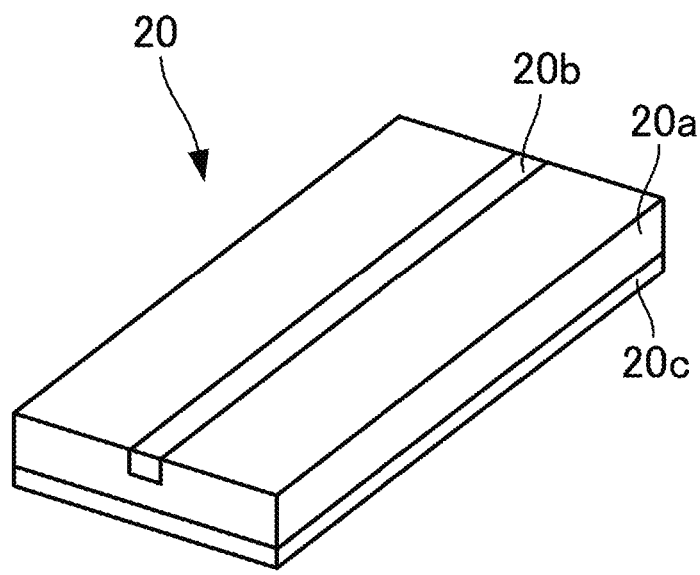
FIG. 2 is a schematic perspective view illustrating a heat-resistant tape according to the embodiment of the present invention.

FIGS. 1 and 2 illustrate an embodiment of a heat-shrinkable slitted tube according to the present invention. FIG. 1 illustrates a heat-shrinkable slitted tube 1.

In FIG. 1, the heat-shrinkable slitted tube 1 includes a tube main body 10 and a heat-resistant tape 20, which is a member fastening the tube 1 in a closed state.

The tube main body 10 is formed of a heat-shrinkable resin material (such as, for example, polyolefin, a fluorinated polymer, or a thermoplastic elastomer), and is capable of bending in a tube shape due to the thinness and deformable nature of the material.

As shown in FIG. 1, the tube main body 10 is bent into a tube shape such that length-direction end portions 10b and 10c of a substantially rectangular sheet material are brought adjacent to each other, thereby forming a tube shape having a slit 10a between the two end portions 10b and 10c. In this example, in a case where an external force is applied to deform the tube main body 10 prior to shrinking, the tube main body 10 has a property which restores the posture of the tube main body 10 to a form where the slit 10a is open.

As shown in FIG. 2, the heat-resistant tape 20 is a substantially rectangular tape member formed by a resin material (such as, for example, polyethylene terephthalate) having heat-resistant characteristics enabling the tape 20 to withstand heating while the tube main body 10 is shrunk.

The heat-resistant tape 20 includes, on a tape main body 20a, an indicator 20b and an adhesive face 20c, and is affixed so as to intervene between areas proximate to the two end portions 10b and 10c of the tube main body 10. In this example, in the heat-resistant tape 20, a surface of the tape main body 20a on which the indicator 20b is formed configures a first surface, and a surface on which the adhesive face 20c is formed configures a second surface.

The indicator 20b is a straight line formed at a short-direction center portion of the heat-resistant tape 20 and which extends in a length direction of the heat-resistant tape 20. The indicator 20b has a different color than the tube main body 20a. In this example, in a case where a plurality of heat-shrinkable slitted tubes 1 are used, the indicator 20b may be configured so as to have a different color for each heat-shrinkable slitted tube 1.

By employing such a configuration, the heat-shrinkable slitted tube 1 can identify a classification of a wire harness W (described below) to which the heat-shrinkable slitted tube 1 is attached using the color of the indicator 20b.

The adhesive face 20c is formed by an adhesive (such as, for example, an acrylic adhesive) which does not lose bond strength at high temperatures used to shrink the tube main body 10. The adhesive face 20c is affixed to the areas proximate to the two end portions 10b and 10c of the tube main body 10, and thereby the heat-shrinkable slitted tube 1 can maintain a deformed posture.

Next, with reference to FIGS. 3A and 3B through 5A and 5B, a method is described of attaching the heat-shrinkable slitted tube 1 to the wire harness W having a terminal crimped to a forefront end of an electric wire or wire bundle.

Figure 3A:
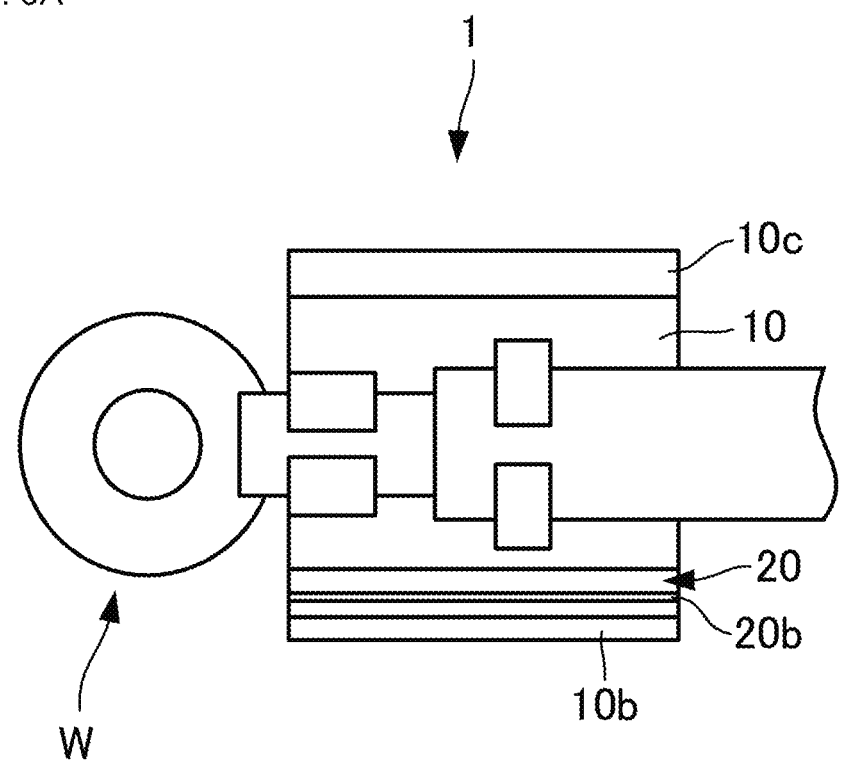
FIG. 3A is a schematic plan view illustrating a state in which a wire harness is accommodated within the heat-shrinkable slitted tube according to the embodiment of the present invention.
Figure 3B:
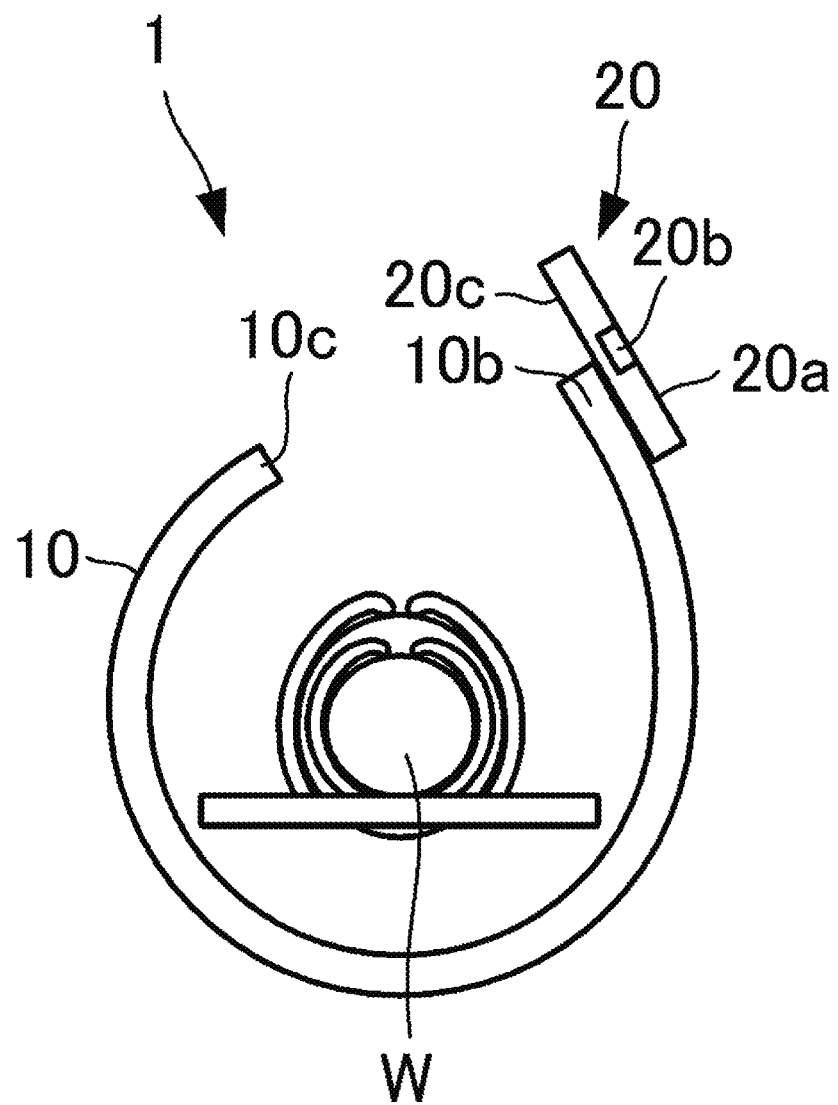
FIG. 3B is a schematic front view illustrating a state in which the wire harness is accommodated within the heat-shrinkable slitted tube according to the embodiment of the present invention.
Figure 4A:
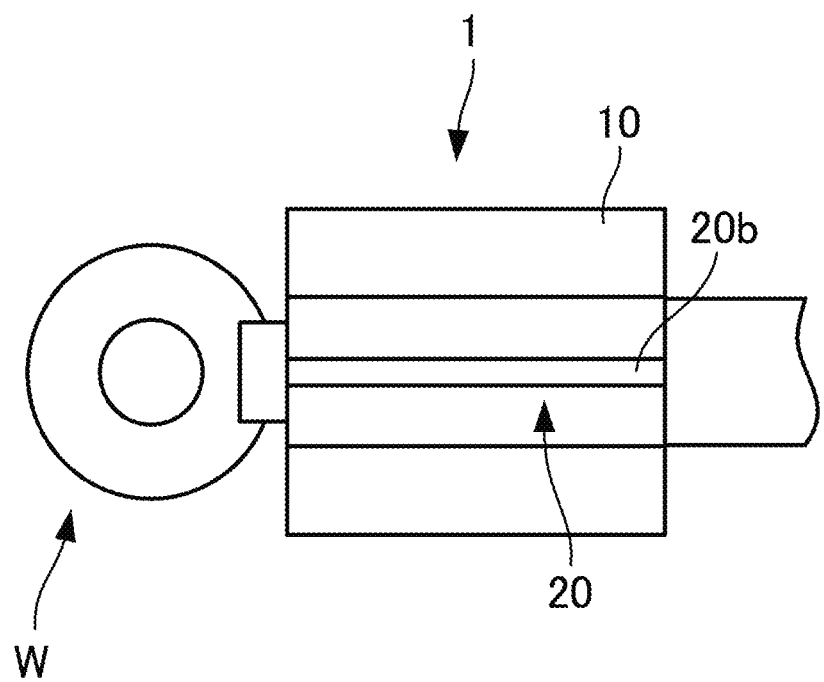
FIG. 4A is a schematic plan view illustrating a state in which the heat-shrinkable slitted tube according to the embodiment of the present invention is in a closed state.
Figure 4B:
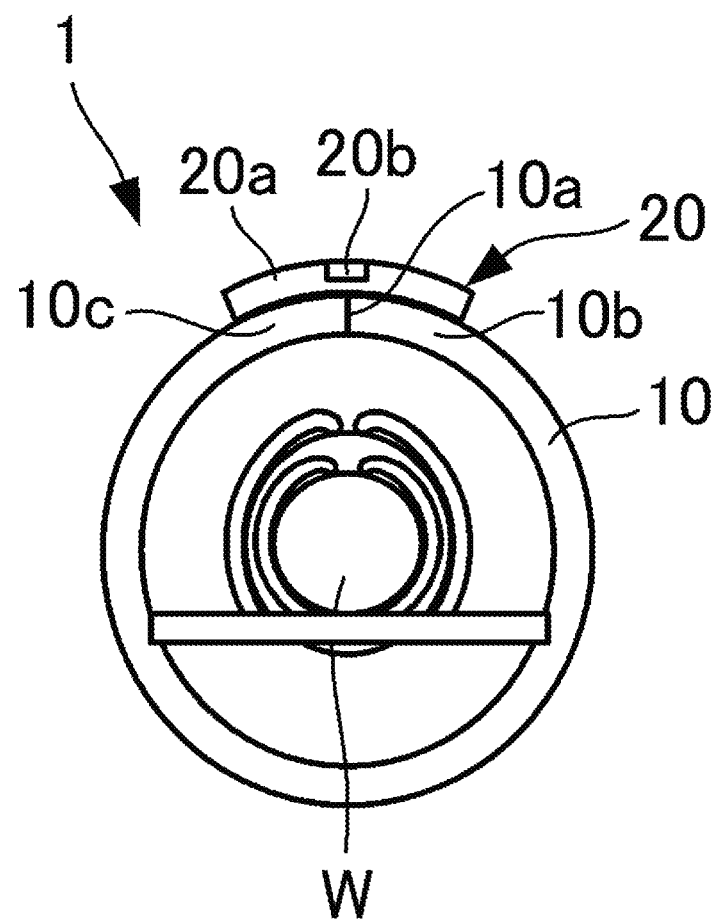
FIG. 4B is a schematic front view illustrating a state in which the heat-shrinkable slitted tube according to the embodiment of the present invention is in the closed state.
Figure 5A:
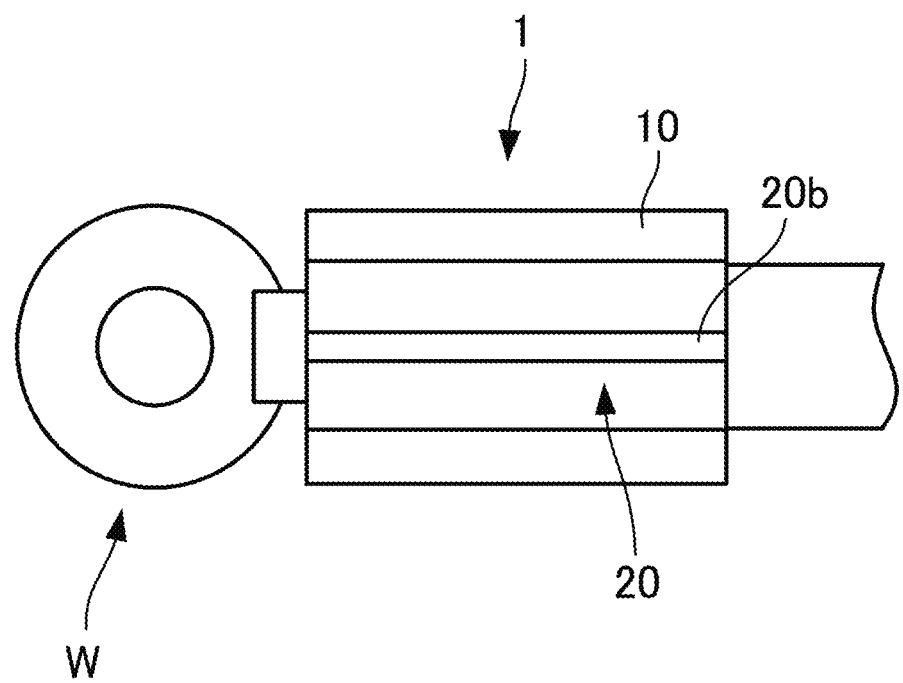
FIG. 5A is a schematic plan view illustrating a state in which the heat-shrinkable slitted tube according to the embodiment of the present invention is mounted to the wire harness.
Figure 5B:
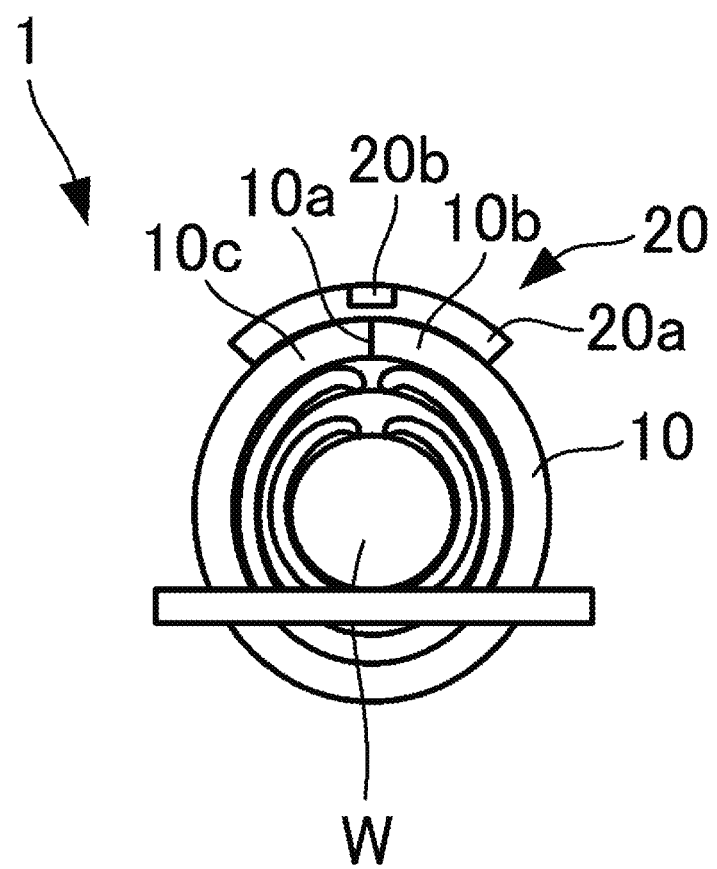
FIG. 5B is a schematic front view illustrating a state in which the heat-shrinkable slitted tube according to the embodiment of the present invention is mounted to the wire harness.

With reference to FIGS. 3A and 3B through 5A and 5B, FIGS. 3A, 4A, and 5A each illustrate plan views in various states, whereas FIGS. 3B, 4B, and 5B each illustrate front views in various states.

First, as shown in FIGS. 3A and 3B, the heat-shrinkable slitted tube 1 is bent so as to separate the two end portions 10b and 10c of the tube main body 10 from each other so as to enable the wire harness W to be accommodated through the slit 10a of the tube main body 10. In this way, by accommodating the wire harness W through the slit 10a, the heat-shrinkable slitted tube 1 can be attached to the wire harness W even after a terminal is crimped to the wire harness W.

At this point, the heat-resistant tape 20 is affixed to the tube main body 10 of the heat-shrinkable slitted tube 1 such that one end portion 10b of the tube main body 10 is positioned at the short-direction center portion of the indicator 20b of the heat-resistant tape 20.

Next, as shown in FIGS. 4A and 4B, by bringing together the two end portions 10b and 10c of the tube main body 10, the heat-shrinkable slitted tube 1 is placed in a closed state, deformed such that the slit 10a is closed, and the areas proximate to the two end portions 10b and 10c are fastened to each other with the heat-resistant tape 20 so as to maintain the closed state.

By fastening the areas proximate to the two end portions 10b and 10c to each other with the heat-resistant tape 20, the heat-shrinkable slitted tube 1 prevents the tube main body 10, which has been bent into a tube shape encircling the wire harness W and placed in a closed state, from returning from the closed state to a posture where the slit 10a is open, and the heat-shrinkable slitted tube 1 can maintain the closed state.

With this configuration, the heat-shrinkable slitted tube 1 according to the present embodiment maintains the closed state prior to shrinking using the heat-resistant tape 20, and even when the closed state is achieved by bringing together the two end portions 10b and 10c of the tube main body 10 at the time of shrinking, shrinking is performed while the closed state is maintained by the heat-resistant tape 20, enabling shrinking to be performed without wrapping failure. Therefore, in the heat-shrinkable slitted tube 1, there is no need to provide the tube main body 10 with overlap margins, and the tube main body 10 can be reduced in size, and costs can be reduced.

In addition, because the heat-shrinkable slitted tube 1 according to the present embodiment maintains the closed state with the heat-resistant tape 20, the heat-resistant tape 20 is not altered by heating during shrinking and the closed state can be reliably maintained. In addition, by affixing the heat-resistant tape 20, the closed state can be readily maintained even prior to shrinking, and therefore work efficiency can be improved.

Moreover, in the heat-shrinkable slitted tube 1, one end portion 10b of the tube main body 10 is positioned near the short-direction center portion of the indicator 20b of the heat-resistant tape 20, and therefore in a case where the other end portion 10c of the tube main body 10 is brought together with the end portion 10b to achieve the closed state, the heat-resistant tape 20 is affixed so as to intervene between the areas proximate to the two end portions 10b and 10c.

Accordingly, in the heat-shrinkable slitted tube 1 according to the present embodiment, in a case where the two end portions 10b and 10c of the tube main body 10 are brought together to achieve the closed state in which the slit 10a is closed prior to shrinking, by using the position of the indicator 20b as a reference to bring the two end portions 10b and 10c together, the heat-resistant tape 20 can be reliably provided to the areas proximate to the two end portions 10b and 10c and the closed state can be maintained. Therefore, the closed state can be readily achieved and the heat-shrinkable slitted tube 1 can be attached to the wire harness W.

Next, as shown in FIGS. 5A and 5B, by heating the tube main body 10 to a high temperature, heat shrinking is performed on the heat-shrinkable slitted tube 1 and the heat-shrinkable slitted tube 1 is attached to the wire harness W.

In this example, for the tube main body 10, the heat-resistant tape 20 is affixed near the two end portions 10b and 10c. Therefore, thermal conductivity near the two end portions 10b and 10c is reduced. Accordingly, the point in time where shrinking at the areas proximate to the two end portions 10b and 10c begins due to heating is later than at a short-direction center portion of the tube main body 10.

The short-direction center portion of the tube main body 10 begins to shrink before the areas proximate to the two end portions 10b and 10c. Therefore, during shrinking, the tube main body 10 shrinks such that the two end portions 10b and 10c shrink toward the short-direction center portion of the tube main body 10. In other words, during shrinking, the tube main body 10 attempts to shrink such that the closed state is released. However, because the heat-resistant tape 20 is affixed in the areas proximate to the two end portions 10b and 10c, the closed state is maintained even during shrinking.

In a case where the respective areas proximate to each of the end portions 10b of the tube main body 10 are mutually fastened by the heat-resistant tape 20, when an affixing position of the heat-resistant tape 20 is defined so as to achieve the closed state, in which the two end portions 10b and 10c of the tube main body 10 forming the slit 10a are brought together, heat shrinking of the tube main body 10 can be accomplished comparatively uniformly. However, in a portion of the tube main body 10 covered by the heat-resistant tape 20, heat shrinking is somewhat more constrained than in exposed portions, and therefore the affixing position is preferably defined at a straight line portion or flat portion of the wire harness W.

As noted above, the heat-shrinkable slitted tube 1 according to the present embodiment maintains the closed state prior to shrinking using the heat-resistant tape 20, and even when the closed state is achieved by bringing together the two end portions 10b and 10c of the tube main body 10 at the time of shrinking, shrinking is performed while the closed state is maintained by the heat-resistant tape 20, enabling shrinking to be performed without wrapping failure. Therefore, in the heat-shrinkable slitted tube 1, there is no need to provide the tube main body 10 with overlap margins, and the tube main body 10 can be reduced in size, and costs can be reduced.

In addition, in the heat-shrinkable slitted tube 1 according to the present embodiment, in a case where the two end portions 10b and 10c of the tube main body 10 are brought together to achieve the closed state in which the slit 10a is closed prior to shrinking, by using the position of the indicator 20b as a reference to bring the two end portions 10b and 10c together, the heat-resistant tape 20 can be reliably provided to the areas proximate to the two end portions 10b and 10c and the closed state can be maintained. Therefore, the closed state can be readily achieved and the heat-shrinkable slitted tube 1 can be attached to the wire harness W.

In addition, because the heat-shrinkable slitted tube 1 according to the present embodiment maintains the closed state with the heat-resistant tape 20, the heat-resistant tape 20 is not altered by heating during shrinking and the closed state can be reliably maintained. In addition, by affixing the heat-resistant tape 20, the closed state can be readily maintained even prior to shrinking, and therefore work efficiency can be improved.

Also, the heat-shrinkable slitted tube 1 according to the present embodiment can identify the classification of the wire harness W to which the heat-shrinkable slitted tube 1 is attached using the color of the indicator 20b.

Figure 6:
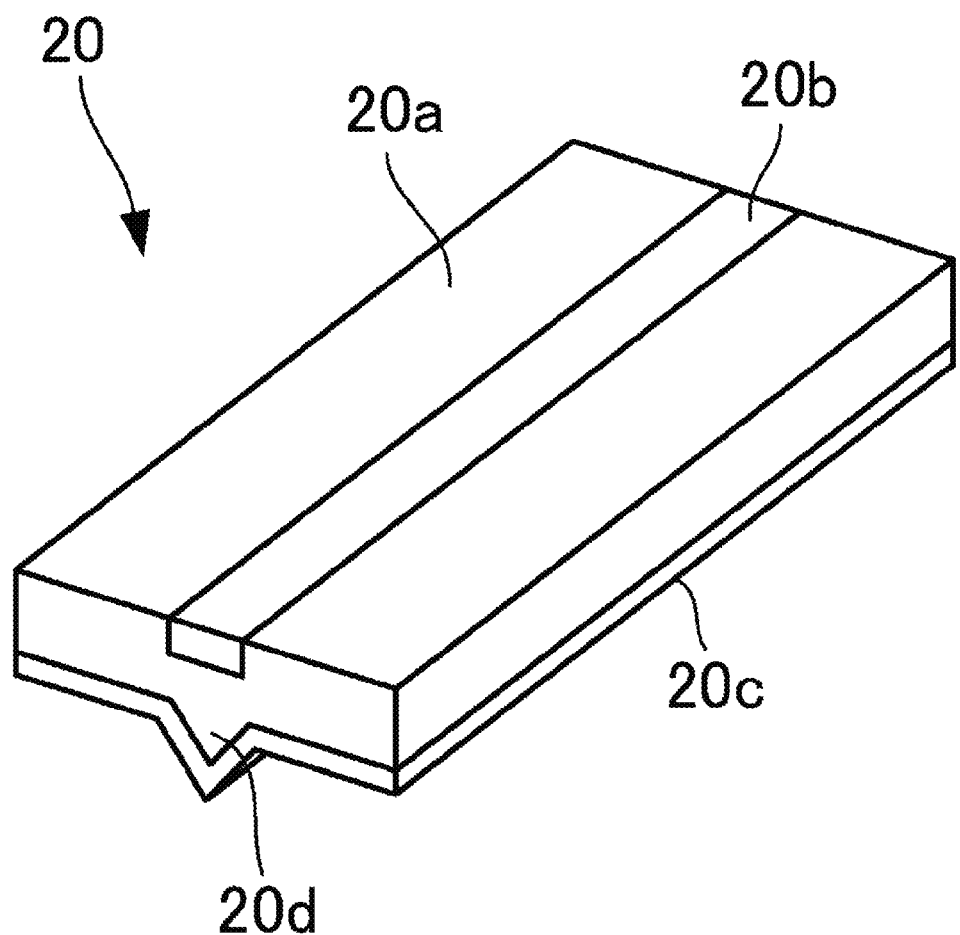
FIG. 6 is a schematic perspective view illustrating a modification of the heat-resistant tape according to the embodiment of the present invention.

In the present embodiment, the adhesive face 20c is formed on the second surface of the heat-resistant tape 20, which is flat. However, the present embodiment is not limited to this. As shown in FIG. 6, a configuration is also possible in which, for example, a position on the second surface located opposite the indicator 20b includes a projection 20d extending in the length direction.

Figure 7:
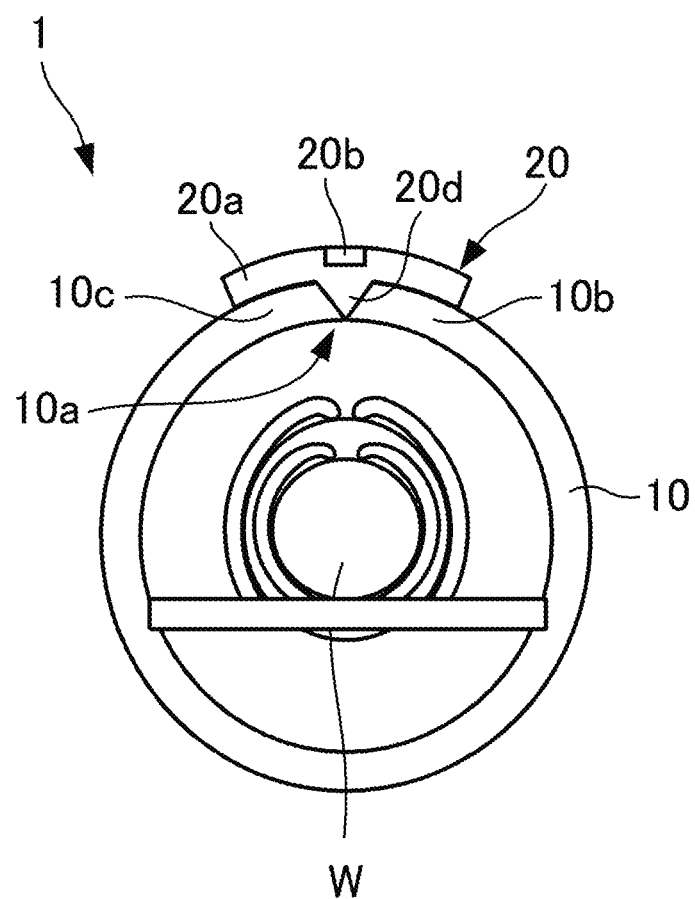
FIG. 7 is a schematic front view illustrating a state in which the heat-shrinkable slitted tube achieves a closed state using the modification of the heat-resistant tape according to the embodiment of the present invention.

By employing such a configuration, as shown in FIG. 7, the closed state can be achieved in the heat-shrinkable slitted tube 1 by bringing the two end portions 10b and 10c of the tube main body 10 into contact with the projection 20d prior to shrinking. Therefore, the closed state can be readily achieved and the heat-shrinkable slitted tube 1 can be attached to the wire harness W.

Figure 8:
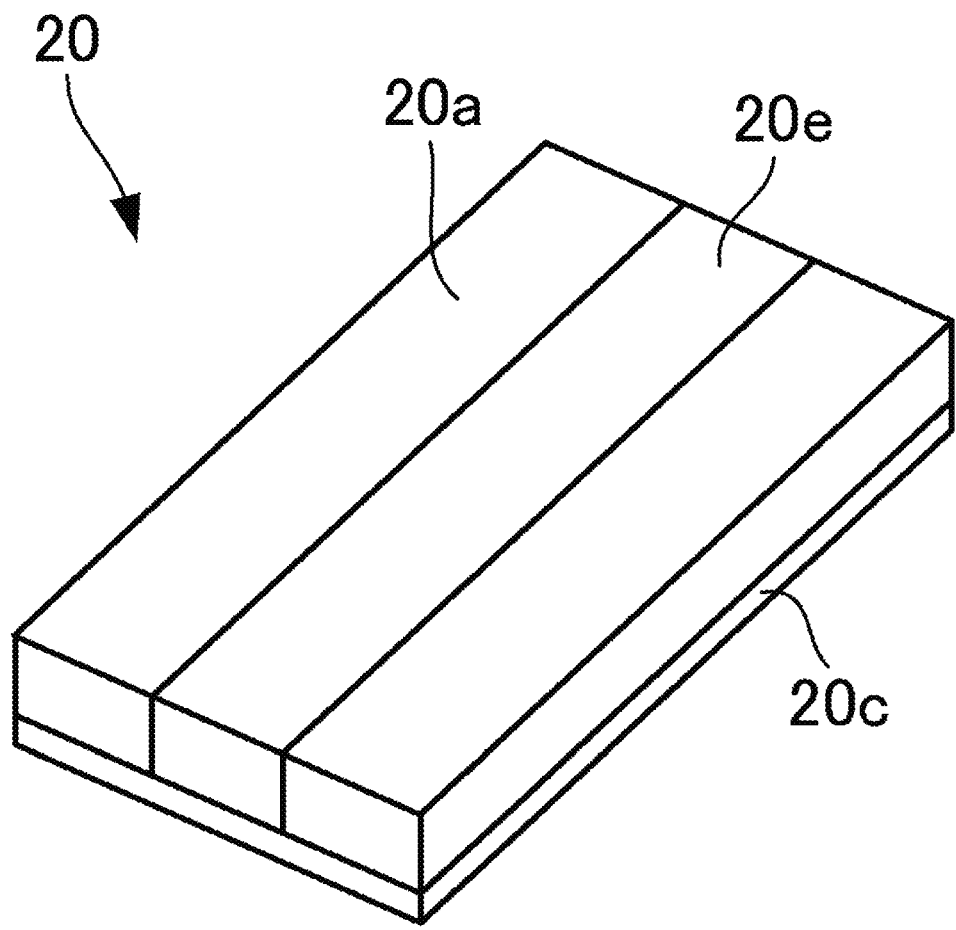
FIG. 8 is a schematic perspective view illustrating a modification of the heat-resistant tape according to the embodiment of the present invention.

In addition, in the present embodiment, the indicator 20b is formed on the first surface of the heat-resistant tape 20. However, the present embodiment is not limited to this. As shown in FIG. 8, a configuration is also possible in which, for example, an indicator 20e is formed so as to be present from the first surface through to the second surface, and the indicator 20e is formed from a semi-transparent or transparent material.

Figure 9A:
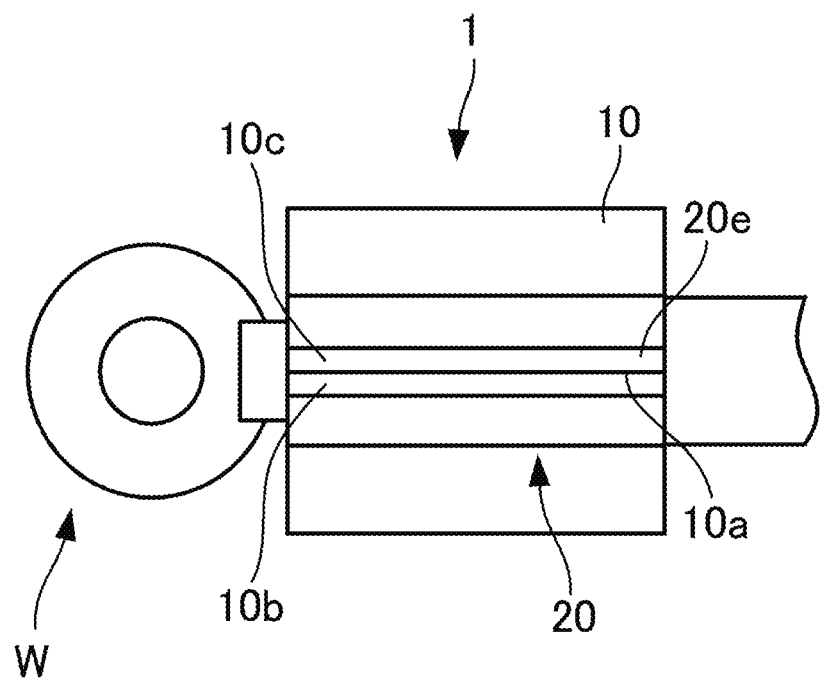
FIG. 9A is a schematic plan view illustrating a state in which the heat-shrinkable slitted tube achieves a closed state using the modification of the heat-resistant tape according to the embodiment of the present invention.
Figure 9B:
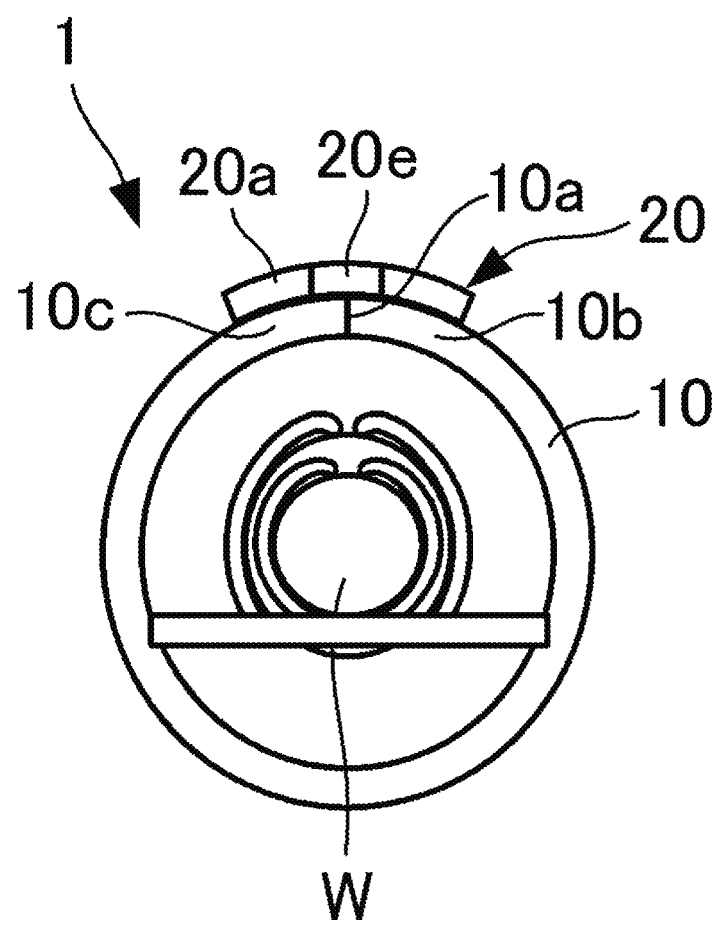
FIG. 9B is a schematic front view illustrating a state in which the heat-shrinkable slitted tube achieves a closed state using the modification of the heat-resistant tape according to the embodiment of the present invention.

By employing such a configuration, as shown in FIGS. 9A and 9B, a state of the two end portions 10b and 10c of the tube main body 10 can be observed through the indicator 20e prior to shrinking. Therefore, the two end portions 10b and 10c of the tube main body 10 can be readily brought together to achieve the closed state and the heat-shrinkable slitted tube 1 can be attached to the wire harness W.

In addition, in the present embodiment, the heat-shrinkable slitted tube 1 is attached to a single wire harness W. However, the present embodiment is not limited to this and the heat-shrinkable slitted tube 1 may also be mounted so as to bundle together a plurality of wire harnesses W, for example.

DESCRIPTION OF REFERENCE NUMERALS

1 Heat-shrinkable slitted tube
10 Tube main body
10a Slit
10b, 10c End portion
20 Heat-resistant tape
20b, 20e Indicator
20d Projection

RELATED ART

Patent Literature

Patent Literature 1: Japanese Patent Laid-open Publication No. 2012-131132

What is claimed is:

1. A heat-shrinkable slitted tube comprising:
a tube main body configured for bending into a tube shape encircling a wire or wire bundle, the tube main body including a slit extending in a length direction, the slit being defined between two end portions of the tube main body, and the tube main body being shrinkable due to application of heat; and
a member fastening the tube in a closed condition in which the tube main body is deformed extends along the length direction of the tube main body so as to close the slit, the member fastening the tube in the closed condition fastens together areas proximate to the two end portions of the tube main body so as to maintain the closed condition,
wherein the member fastening the tube in the closed condition comprises:
at a short-direction center portion of the member, an indicator in the shape of a straight line extending in the length direction of the tube main body such that the slit is visible through the indicator.

2. The heat-shrinkable slitted tube according to claim 1, wherein the member fastening the tube in the closed condition comprises a heat-resistant tape affixed so as to intervene between the areas proximate to the two end portions of the tube main body.

3. The heat-shrinkable slitted tube according to claim 1, wherein the indicator is configured with a color differing according to a classification of the wire or wire bundle the tube main body encircles.

4. The heat-shrinkable slitted tube according to claim 1, wherein the member fastening the tube in the closed condition comprises a first surface on which the indicator is formed and a second surface on which is formed an adhesive layer to be affixed to the tube main body, and
the member fastening the tube in the closed condition comprises a projection that extends along the length direction of the tube main body and protrudes from a position on the second surface in a direction opposite the indicator.

5. A heat-shrinkable slitted tube comprising:
a tube main body configured for bending into a tube shape encircling a wire or wire bundle, the tube main body including a slit extending along a length direction, the slit being defined between two end portions of the tube main body, and the tube main body being shrinkable due to application of heat; and
a member fastening the tube in a closed condition in which the tube main body is deformed extends along the length direction of the tube main body so as to close the slit, the member fastening the tube in the closed condition fastens together areas proximate to the two end portions of the tube main body so as to maintain the closed condition,
wherein the member fastening the tube in the closed condition comprises:
at a short-direction center portion of the member, an indicator in the shape of a straight line extending along the length direction of the tube main body;
a first surface on which the indicator is formed;
a second surface on which is formed an adhesive layer to be affixed to the tube main body; and
a projection that extends along the length direction of the tube main body and protrudes from a position on the second surface in a direction opposite the indicator.

6. The heat-shrinkable slitted tube according claim 5, wherein the member fastening the tube in the closed condition comprises a heat-resistant tape affixed so as to intervene between the areas proximate to the two end portions of the tube main body.

7. The heat-shrinkable slitted tube according to claim 5, wherein the indicator is configured with a color differing according to a classification of the wire or wire bundle the tube main body encircles.

8. The heat-shrinkable slitted tube according to claim 5, wherein the member fastening the tube in the closed condition is configured such that the slit is visible through the indicator.

\* \* \* \* \*